United States Patent [19]

Hill

[11] Patent Number: 4,737,638

[45] Date of Patent: Apr. 12, 1988

[54] PRESELECTOR SOURCE FOR ISOTOPE SEPARATION

[75] Inventor: David A. Hill, Culver City, Calif.

[73] Assignee: Isotope Purifiers Ltd., Palos Verdes Estates, Calif.

[21] Appl. No.: 946,826

[22] Filed: Dec. 29, 1986

[51] Int. Cl.⁴ .............................................. H01J 49/30
[52] U.S. Cl. ...................................... 250/288; 250/298
[58] Field of Search .................... 250/288, 288 A, 298, 250/443.1, 284, 281

[56] References Cited

U.S. PATENT DOCUMENTS 2,533,966 12/1950 Simmons, Jr. ...................... 250/284
3,758,777 10/1973 Brunnee et al. ...................... 250/288

Primary Examiner—Carolyn E. Fields
Assistant Examiner—John A. Miller
Attorney, Agent, or Firm—Roberts & Floyd

[57] ABSTRACT

An apparatus for recycling non-collimated particles to the ionizer chamber of a beam forming subsystem of a magnetic mass spectrometer which includes a cryogenically cooled moving element forming a portion of the wall of the ion separation chamber between the pole tips of the magnet.

1 Claim, 1 Drawing Sheet

PRESELECTOR SOURCE FOR ISOTOPE SEPARATION

This invention is disclosed in part in my co-pending application entitled THERMAL CYCLE RECIRCULATING PUMP FOR ISOTOPE PURIFIER, filed on even date with the present application.

SUMMARY OF THE INVENTION

An apparatus for recycling non-collimated particles to the ionizer chamber of a beam forming subsystem of a magnetic mass spectrometer which includes a cryogenically cooled moving element forming a portion of the wall of the ion separation chamber between the pole tips of the magnet.

BACKGROUND OF THE INVENTION

Many elements have chemically identical isotopes, which vary only in the number of their neutrons. These isotopes of a single element are often co-produced in a single reaction. The isotopes of a single element do vary, particularly in their radioactivity, and therefore purification or separation of the isotopes leads to an improved product. However, these isotopes, being chemically identical, are difficult to separate.

By way of example, iodine-123 is a close-to-ideal radioactive isotope used in nuclear medicine. It permits diagnostic tomography of a patient's brain to allow a physician to distinguish between multiple infarct dementia, associated with a series of strokes, and Alzheimer's Disease. These two diseases, requiring quite different treatment, have, prior to diagnostic tomography, given only obscure and conflicting symptoms.

Pure iodine-123 is close-to-ideal because it has a 13 hour half life allowing shipment nationwide and yet decaying sufficiently rapidly so that the patient does not receive an excessive dosage of radiation. Pure iodine-123 emits a single characteristic energy, 159 keV, and practically no other radiation. Pure iodine-123 is well tolerated by the human organism and is readily compounded as a label into many biochemical agents without disrupting their action.

The principal drawback to the use of pure iodine-123 in nuclear medicine is that pure iodine-123 is expensive to produce. Most of the iodine-123 which is available is not pure. It is produced by a 20 to 40 MeV cyclotron or linear accelerator. The high energy protons from the cyclotron bombard a target enriched in tellurium-124, whose atomic number is 52 compared with iodine whose atomic number is 53. The high energy proton principally dislodges two neutrons to produce iodine-123 in the reaction:

Te-124 (p,2n)→I-123

Some of the bombarding protons dislodge only one neutron. In addition, the target contains residual amounts of tellurium-125 and tellurium-126. The result is that about 3% of iodine-124 and iodine-125 is co-produced in the side reactions:

Te-124 (p,n)→I-124
Te-125 (p,n)→I-125
Te-126 (p,2n)→I-125

These two isotopes of iodine, even a few percent, are each unwanted in nuclear medicine for different reasons. Iodine-124 emits other radiation which degrades the output of diagnostic tomography, making it a less precise test. The radiation from iodine-125 is soft, i.e., X-rays which are absorbed within the patient, and therefore does not degrade the output of diagnostic tomography. However, iodine-125 has a half life of 60 days, thus substantially increasing the internal radiation dosage to the patient.

Two alternative processes exist to produce pure iodine-123. The first one uses a 20–40 MeV cyclotron in which the high energy proton bombards a target of xenon-124 and dislodges two neutrons to produce cesium-123. This then decays in 8 minutes to xenon-123, which decays in 2 hours to iodine-123, according to the reaction:

Xe124 (p,2n)→Cs-123 (8 min)→Xe 123 (2 hrs)→I-123

This reaction produces high purity iodine-123, but does so very expensively because xenon-124 is a very rare isotope. The process was, until recently, therefore limited to research applications.

The second process uses a 70 MeV cyclotron with an iodine 127 target. The high energy proton can dislodge 5 neutrons to produce xenon-123, which decays in 2 hours to a solid iodine-123 according to the reaction:

I-127 (p,5n)→Xe-123 (2 hr)→I-123

In a first side reaction the proton dislodges 4 neutrons to produce a gaseous xenon-124, according to the reaction:

I-127 (p,4n)→Xe-124 (stable)

which is a stable gas, and further separates from the solid iodine-123.

Another side reaction occurs. In this, the proton dislodges three neutrons to produce xenon-125, which decays to iodine-125, according to the reaction:

I-127 (p,3n)→Xe-125→I-125

About 0.2% of iodine-125 is co-produced and is a contaminant.

To date, all 70 MeV cyclotrons have been built for research, not commercial applications, due to the expense of building and operating them. One 70 MeV cyclotron should become operational in the United States in 1986, which will be the first one dedicated to the commercial production of radioactive isotopes for nuclear medicine.

A technology to purify or separate a polyisotopic mixture has existed since the 1920's. This is the magnetic mass spectrometer or mass analyzer, which achieves a physical separation according to mass by differentially deflecting ionized isotopes of different atomic weight, the lighter isotopes being deflected more than the heavier isotopes.

The first step in a magnetic mass spectrometer is to ionize the isotopes in an ion source. At most only a small portion of the isotopes can be ionized and the remainder of the isotopes escape into the vacuum chamber with no charge and are therefore neither accelerated by the electrode nor deflected by the magnet. Recoveries of 1% to 15% of the desired isotope are typical.

These elements of the present invention appear in innumerable prior art publications, and applicant will not attempt to separately identify what may be the closest prior art.

The applicant has found only two items in the prior art pertinent to the present invention:

Simmons, U.S. Pat. No. 2,533,966, issued Dec. 12, 1950, discloses a novel method to accelerate ions, a moving magnetic field. Simmons also discloses an ion source 17, having two feed pipes for ions, 13 and 14, and two exit pipes 19 and 22. Pipe or casing 22 contains a focusing field 45 for the ionized isotopes to exit into the magnetic field of force 48 of a mass spectrometer. At the other end of the ion source is a grid 20 which repels the ionized isotopes but allows the un-ionized isotopes to enter pipe or conduit 19. These isotopes, supplemented by the feed stock, are recirculated to the ion source through pipes 13 and 14. There is no means to prevent un-ionized isotopes from escaping at the larger opening 21 nor any recirculation of any un-ionized isotopes which escape the ion source 17 at opening 21.

There are crucial differences between the Simmons disclosure and the present invention. First, the present invention recirculates the uncharged isotopes which have left the ionizer chamber with the charged ions, while Simmons withdraws uncharged isotopes from the ionizer and merely recirculates them to the ionizer with no apparent means for increasing the recovery rate thereby. Secondly, the present invention recirculates by first adsorbing and then desorbing the iodine isotope on a glass surface. Simmons recirculates the isotope in the same gaseous state in which it left the ionizer.

Meunier, et al., Nuclear Instruments and Methods 139 (1976) 101-104 discloses a "closed loop circuit" used on two research machines for isotope separation near Paris, France. The machine has a conventional ion source, aperture, vacuum chamber and magnetic mass spectrometer.

Spaced along the vacuum chamber are a series of side chambers, each containing a vacuum pump for the un-ionized isotopes. There is a cascade series of pumps, including oil diffusion pumps, which raise the pressure from $10^{-5}$ Torr to atmospheric pressure. The recovered isotopes are mixed with feed stock and reintroduced to the ion source. The overall recovery rate ranges from 11 to 32%, perhaps a four-fold improvement over conventional, non-recovery isotope separators. This system is limited to inert gases which will not bond to the metal pump parts.

The present invention is an internal recycle under high vacuum, while Meunier is an external recycle utilizing several cascaded pumps to raise the isotope to atmospheric pressure, then reintroduce it to the ionizer under vacuum. The present invention has a recycle loop which is clean, non-reactive, and therefore suitable for iodine. It is non-contaminating, simple, compact and relatively cheap with a recovery rate which may approach 100%. Meunier's recycle loop introduces impurities, is suitable only for inert gases, is complicated, bulky, and expensive. The best utilization reported is 32%.

BRIEF DESCRIPTION OF THE DRAWINGS

The invention will be better understood and the objects other than those set forth above will become apparent when consideration is given to the following detailed description thereof. Such description makes reference to the annexed drawings wherein.

DESCRIPTION OF THE PREFERRED EMBODIMENTS

Figure 1:
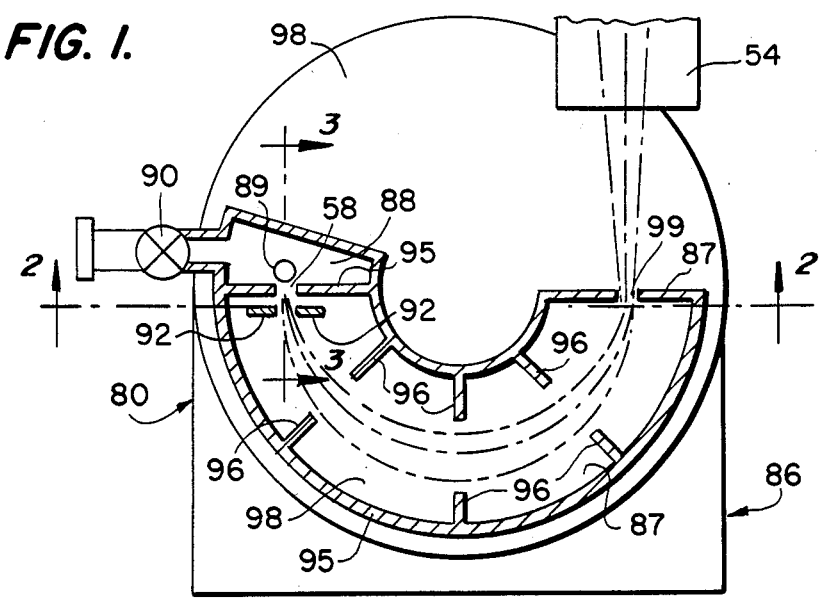
FIG. 1 is a top or plan view of the first embodiment of the invention partially in section.
Figure 2:
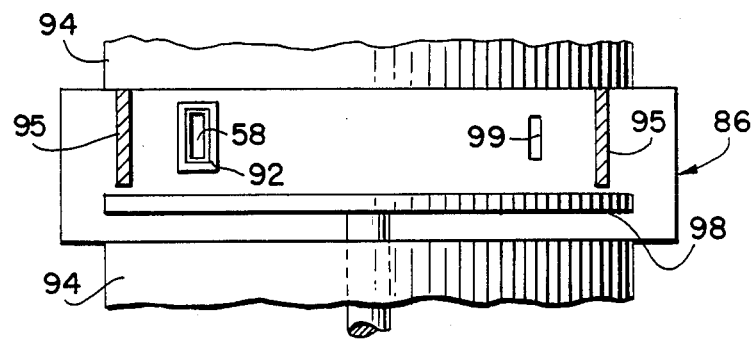
FIG. 2 is a cross-sectional view taken on lines 2—2 of FIG. 1.
Figure 3:
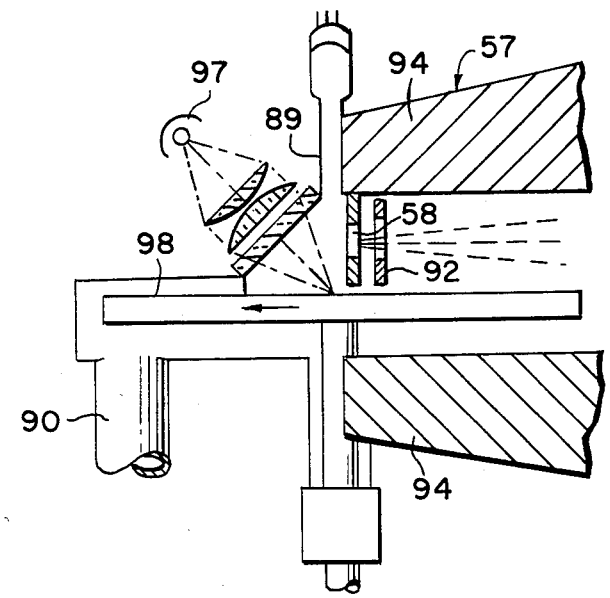
FIG. 3 is a sectional view taken on lines 3—3 of FIG. 1.

The invention consists of a preselector 80 to be used between a conventional prior art ion source and a conventional prior art magnetic mass spectrometer, such as a Danfysik Mini Separator. The purpose of the preselector 80 is to recycle non-collimated particles back to the ionizer chamber 88.

The preselector 80 is of the calutron type and includes a vacuum tank 86 between two pole tips 94 of a magnet. The vacuum tank 86 is exhausted by a vacuum pump, not shown.

Within the vacuum tank 86 is a semicircular ion separation chamber 87. At one end of the ion separation chamber 87 is an ionizer chamber 88, within which is an electron gun 89. Attached to the ionizer chamber 88 is an air lock 90 for charging the preselector 80 with feed material.

The wall 95 between the ionizer chamber 88 and the ion separation chamber 87 contains an aperture 58. Adjacent the aperture 58 is an extraction electrode 92. Within the main chamber are a series of baffles 96. The far wall of the ion separation chamber 87 contains an exit aperture 99.

The bottom wall of the ion separation chamber 87 is a rotating wheel 98 with an axis at the center of the semicircular ion separation chamber 87. The wheel 98 is cryogenically cooled and rotates in the direction from the exit aperture 99 to the ionizer chamber 88.

The top wall and side walls 95 of the ion separation chamber 87 are maintained at a temperature sufficiently high to vaporize the feed material. The wheel 98 is maintained at temperature sufficiently low to condense the feed material. Within the ionizer chamber 88 is an infrared lamp 97 to heat a portion of the cold wheel 98 within the ionizer chamber 88 to revaporize the returned condensed feed material.

In operation, feed material is introduced or charged at the air lock 90. The feed material is a mixture of isotopes; typically, a mixture of iodine-123, iodine-124, and iodine-125.

The ionized isotopes leave the ionizer chamber 88 through the aperture 58, under the influence of the extraction electrode 92. The potential applied to the extraction electrode 92 and the magnetic field between the two pole tips 94 are selected to allow all the singly charged ionized isotopes to move in a semicircular orbit and leave the ion separation chamber 87 through the exit aperture 99.

The preselector 80 is a crude magnetic analyzer because all three isotopes, iodine-123, -124, and -125 leave the preselector 80 where they pass through a conventional beam transport system, which focuses them and they enter a true magnetic mass spectrometer 54, which separates these three neighboring isotopes.

The uncharged isotopes also exit the ionizer chamber 88 through the aperture 58. They are not accelerated by the extraction electrode 92 and are not bent by the magnetic field. When they strike a heated wall 95 or baffle 96, they are reflected to the next surface.

Likewise the doubly-ionized isotopes also exit the ionizer chamber 88 through the aperture 58. They are accelerated by the extraction electrode 92 and are bent by the magnetic field. Due to their charge they hit a baffle 96 because their orbit is too small. They are reflected because the baffle 96 is heated.

At some point all of these non-collimated particles strike the cryogenically cooled rotating wheel 98. They are condensed and mechanically transported back to the ionizer chamber 88. The infrared lamp 97 then revaporizes these condensed isotopes which are again exposed to the electron gun 89 and may become ionized.

Having described my invention, I claim:

1. A preselector (80) apparatus of a calutron type for recycling non-collimated particles including uncharged isotopes to an ionizer chamber (88) comprising in combination:
   (a) means to introduce vaporized isotope into the ionizer chamber (88);
   (b) means to ionize the isotopes within the ionizer chamber (88);
   (c) a semicircular ion separation chamber (87) adjacent the ionizer chamber (88) to bend the ionized isotopes under the influence of a magnetic field;
   (d) said ion separation chamber (87) having a plurality of walls (95) at an elevated temperature to reflect the vaporized uncharged isotopes;
   (e) said ion separation chamber (87) having a moving cryogenically cooled wall (98) to trap and condense the uncharged isotopes;
   (f) said moving wall (98) comprising means for transporting said uncharged isotopes from the ion separation chamber (87) to the ionizer chamber (88);
   (g) means within the ionizer chamber (88) to revaporize the condensed isotopes recycling from the ion separation chamber (87);
wherein said preselector (80) recycles said uncharged isotopes to said ionizer chamber (88).

* * * * *